(12) United States Patent
Ooshita

(10) Patent No.: US 10,295,222 B2
(45) Date of Patent: May 21, 2019

(54) HOT WATER APPARATUS

(71) Applicant: NORITZ CORPORATION, Hyogo (JP)

(72) Inventor: Wataru Ooshita, Himeji (JP)

(73) Assignee: NORITZ CORPORATION, Hyogo (JP)

( * ) Notice: Subject to any disclaimer, the term of this patent is extended or adjusted under 35 U.S.C. 154(b) by 0 days.

(21) Appl. No.: 15/698,733

(22) Filed: Sep. 8, 2017

(65) Prior Publication Data

US 2018/0087805 A1 Mar. 29, 2018

(30) Foreign Application Priority Data

Sep. 26, 2016 (JP) ................. 2016-187229

(51) Int. Cl.
| | |
|---|---|
| F24H 9/06 | (2006.01) |
| F24H 1/12 | (2006.01) |
| F24H 8/00 | (2006.01) |
| F24H 9/18 | (2006.01) |
| F24H 1/40 | (2006.01) |
| F24H 1/44 | (2006.01) |
| F28F 9/00 | (2006.01) |
| F28D 7/02 | (2006.01) |
| F28D 7/00 | (2006.01) |
| F28D 9/00 | (2006.01) |
| F28D 21/00 | (2006.01) |

(52) U.S. Cl.
CPC .............. F24H 1/124 (2013.01); F24H 1/40 (2013.01); F24H 1/445 (2013.01); F24H 8/006 (2013.01); F24H 9/06 (2013.01); F24H 9/1809 (2013.01); F24H 9/1836 (2013.01); F28D 7/0075 (2013.01); F28D 7/0091 (2013.01); F28D 7/02 (2013.01); F28D 9/005 (2013.01); F28D 9/0093 (2013.01); F28D 21/0007 (2013.01); F28F 9/00 (2013.01); *Y02B 30/106* (2013.01)

(58) Field of Classification Search
CPC ... F24H 9/06; F24H 9/18; F24H 1/145; F24H 1/43; F24H 8/006; F24H 9/0031; F24H 1/124; F24H 9/0037; F24F 1/24
See application file for complete search history.

(56) References Cited

U.S. PATENT DOCUMENTS

| | | | | |
|---|---|---|---|---|
| 4,807,588 | A * | 2/1989 | Bentley | F24H 3/105 |
| | | | | 126/110 R |
| 9,702,589 | B2 * | 7/2017 | Kim | F23L 15/00 |
| 9,829,204 | B2 * | 11/2017 | Oohigashi | F24H 8/00 |
| 9,829,257 | B2 * | 11/2017 | Oohigashi | F24H 9/0031 |

(Continued)

FOREIGN PATENT DOCUMENTS

WO 2015/141995 A1 9/2015

*Primary Examiner* — Gregory A Wilson
(74) *Attorney, Agent, or Firm* — Studebaker & Brackett PC

(57) ABSTRACT

A hot water apparatus includes a burner, a latent heat recovery heat exchanger, a housing, a fixing member, an attachment member, and a straightening vane. The fixing member is configured to fix the latent heat recovery heat exchanger to the housing. The attachment member is configured to attach the fixing member to a case. The straightening vane is arranged in the case. The attachment member protrudes into the case. The straightening vane includes a top plate portion arranged upstream from the attachment member in a direction of flow of the heating gas in the case.

12 Claims, 10 Drawing Sheets

(56) References Cited

U.S. PATENT DOCUMENTS

| | | | |
|---|---|---|---|
| 2011/0174891 A1* | 7/2011 | Kowald | F23L 1/00 237/53 |
| 2016/0116228 A1* | 4/2016 | Huang | F28D 21/0007 122/18.2 |
| 2016/0341424 A1* | 11/2016 | Kashihara | F23N 5/245 |
| 2017/0059205 A1* | 3/2017 | Kim | F28F 3/046 |
| 2017/0343213 A1* | 11/2017 | Ono | F23M 20/005 |
| 2018/0058719 A1* | 3/2018 | Se | B21D 51/16 |

\* cited by examiner

FIG.4
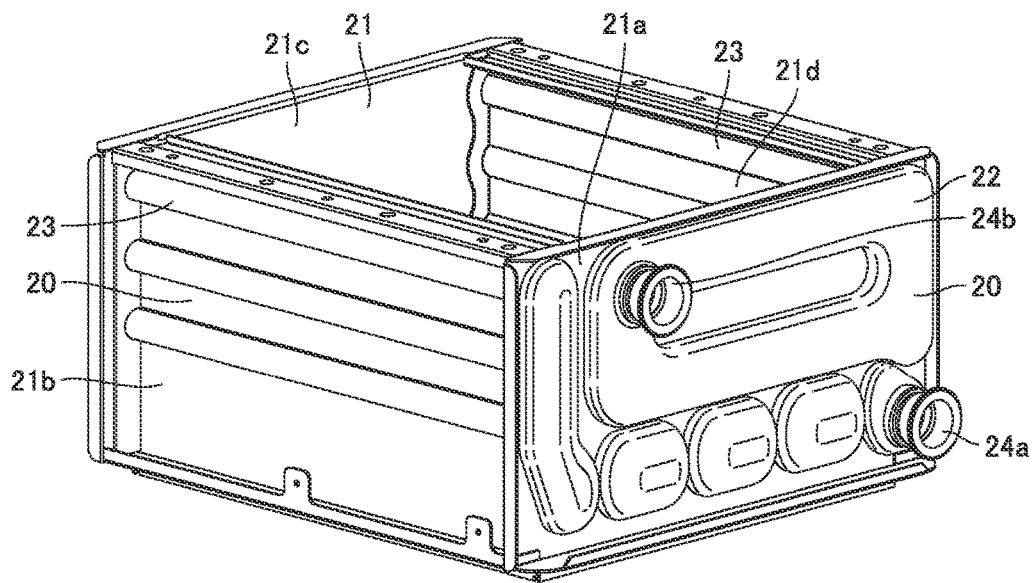
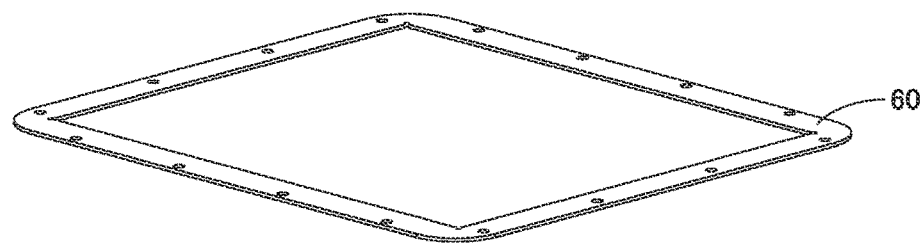
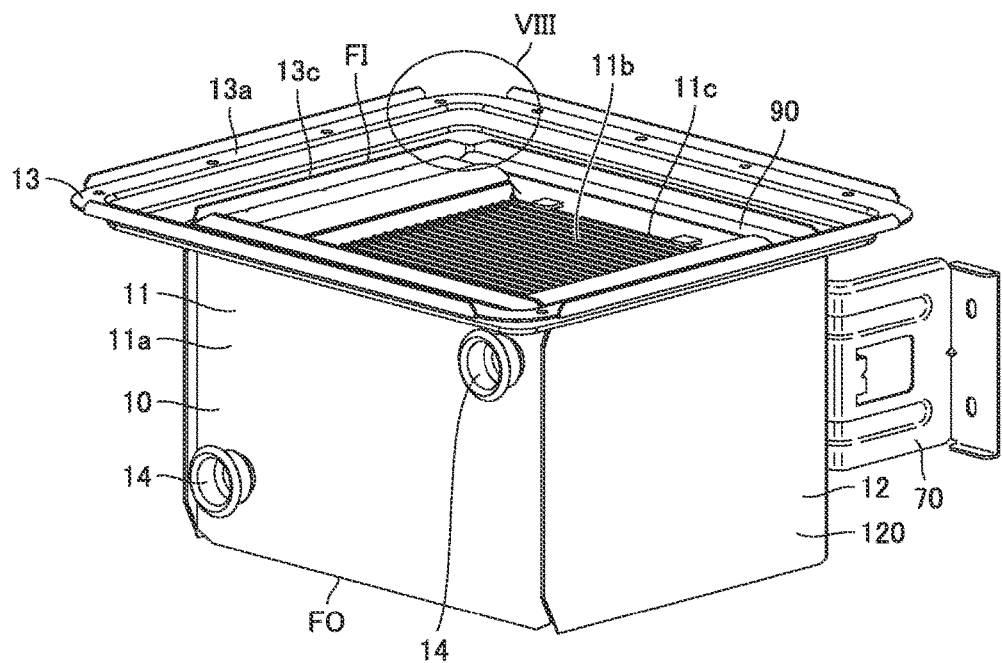

HOT WATER APPARATUS

BACKGROUND OF THE INVENTION

Field of the Invention

The present invention relates to a hot water apparatus.

Description of the Background Art

Some hot water apparatuses include a heat exchanger for exchanging heat between a heating gas and water and/or hot water. This heat exchanger is disclosed, for example, in WO2015/141995. The heat exchanger in this publication is a plate type heat exchanger in which a plurality of heat transfer plates are accommodated in a case.

In general, a heat exchanger is fixed to a housing of a hot water apparatus with a fixing member. Specifically, one end of the fixing member is attached to a case of the heat exchanger and the other end of the fixing member is attached to the housing of the hot water apparatus. In particular, in an example where a heat exchanger is heavy in weight like the plate type heat exchanger in the publication, when one end of a fixing member is attached to a case of a heat exchanger with spot welding, it is difficult to secure strength of attachment of the fixing member to the heat exchanger. Therefore, strength in attachment of the fixing member to the heat exchanger can be secured by attaching one end of the fixing member to the case of the heat exchanger with such an attachment member as a screw.

The attachment member such as a screw is inserted into the case through a wall of the case of the heat exchanger. Therefore, the attachment member may be corroded by adhesion to the attachment member of acidic drainage water which flows in the case.

SUMMARY OF THE INVENTION

The present invention was made in view of the problem above, and an object thereof is to provide a hot water apparatus in which corrosion of an attachment member for attaching a fixing member to a case of a heat exchanger can be suppressed.

A hot water apparatus according to the present invention includes a burner, a heat exchanger, a housing, a fixing member, an attachment member, and a straightening vane. The burner is configured to generate a heating gas. The heat exchanger includes a heat exchange portion for exchanging heat between the heating gas which flows outside and water and/or hot water which flows inside and a case which accommodates the heat exchange portion. The housing accommodates the burner and the heat exchanger. The fixing member is arranged in the housing and configured to fix the heat exchanger to the housing. The attachment member is arranged in the housing and configured to attach the fixing member to the case. The straightening vane is arranged in the case. The attachment member protrudes into the case. The straightening vane includes a top plate portion arranged upstream from the attachment member in a direction of flow of the heating gas in the case.

According to the hot water apparatus in the present invention, the straightening vane includes the top plate portion arranged upstream from the attachment member in the direction of flow of the heating gas in the case. Therefore, drainage water which moves toward the attachment member from above can be blocked by the top plate portion. Adhesion of drainage water to the attachment member can thus be suppressed. Therefore, corrosion of the attachment member by adhesion of drainage water can be suppressed.

In the hot water apparatus, the case includes a first region where the heat exchange portion is arranged and a second region where the straightening vane and the attachment member are arranged. The second region is higher in air passage resistance against the flow of the heating gas than the first region. Therefore, drainage water can be more likely to flow together with the heating gas to the first region than to the second region. Thus, flow of drainage water into the second region can be suppressed. Therefore, adhesion of drainage water to the attachment member arranged in the second region can effectively be suppressed.

In the hot water apparatus, the case includes an inlet where the heating gas flows in, an outlet where the heating gas flows out and a peripheral wall portion which connects the inlet and the outlet to each other. The peripheral wall portion has four sides when the heat exchange portion is viewed from the inlet toward the outlet. The top plate portion is arranged over an entire length of one side of the four sides. Therefore, drainage water which moves toward the attachment member from above can be blocked by the top plate portion over the entire length of one side of the four sides. Therefore, adhesion of drainage water to the attachment member can effectively be suppressed.

In the hot water apparatus, the top plate portion is inclined to have a down grade toward the heat exchange portion. Therefore, drainage water which adheres to the top plate portion can flow toward the heat exchange portion. Thus, adhesion to the attachment member of drainage water which adheres to the top plate portion can effectively be suppressed.

In the hot water apparatus, the straightening vane includes a middle plate portion arranged between the attachment member and the top plate portion. The middle plate portion is inclined to have a down grade toward the heat exchange portion. Therefore, drainage water which adheres to the middle plate portion can flow toward the heat exchange portion. Thus, adhesion to the attachment member of drainage water which adheres to the middle plate portion can effectively be suppressed.

In the hot water apparatus, the straightening vane includes a side plate portion arranged between the heat exchange portion and the attachment member. The side plate portion is connected to a lower end of the middle plate portion. Therefore, drainage water which adheres to the middle plate portion can flow along the side plate portion. Thus, adhesion to the attachment member of drainage water which adheres to the middle plate portion and the side plate portion can be suppressed.

In the hot water apparatus, the case includes an attachment portion to which the attachment member is attached and a recess which surrounds the attachment portion. The recess is recessed outward from the inside of the case. Therefore, by stopping drainage water in the recess, adhesion of drainage water to the attachment member can effectively be suppressed.

In the hot water apparatus, the fixing member includes a flat plate portion and a projection portion which projects from the flat plate portion toward the case of the heat exchanger. The attachment member is attached to the projection portion and the attachment portion while the projection portion is fitted to the attachment portion. Therefore, as the projection portion is fitted to the attachment portion, positioning of the fixing member to the case is facilitated.

In the hot water apparatus, the straightening vane includes a biasing portion arranged between the top plate portion and the heat exchange portion. The top plate portion abuts on the case while the biasing portion biases the top plate portion in a direction away from the heat exchange portion. Therefore, a gap between the top plate portion and the case can be closed. Thus, adhesion of drainage water to the attachment member through a gap between the top plate portion and the case can be suppressed.

In the hot water apparatus, the heat exchanger includes a flange member arranged in an upper end portion of the case. The flange member includes an extension portion which extends from the upper end portion of the case to the outside of the case, an opening surrounded by the extension portion, and a rising coupling portion which rises upward from the extension portion so as to surround the opening. A first cut portion provided in an upper edge of the rising coupling portion is arranged to be superimposed on a second cut portion provided in an upper edge of the upper end portion of the case while the upper end portion of the case is inserted in the opening. The top plate portion is arranged below the first cut portion and the second cut portion. Therefore, drainage water which flows in through the first cut portion and the second cut portion can be blocked by the top plate portion. Thus, adhesion to the attachment member of drainage water which flows in through the first cut portion and the second cut portion can be suppressed.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 is an exploded perspective view schematically showing the construction of the sensible heat recovery heat exchanger and the latent heat recovery heat exchanger in one embodiment of the present invention.

DESCRIPTION OF THE PREFERRED EMBODIMENTS

An embodiment of the present invention will be described below with reference to the drawings.

A construction of a hot water apparatus in one embodiment of the present invention will initially be described.

Figure 1:
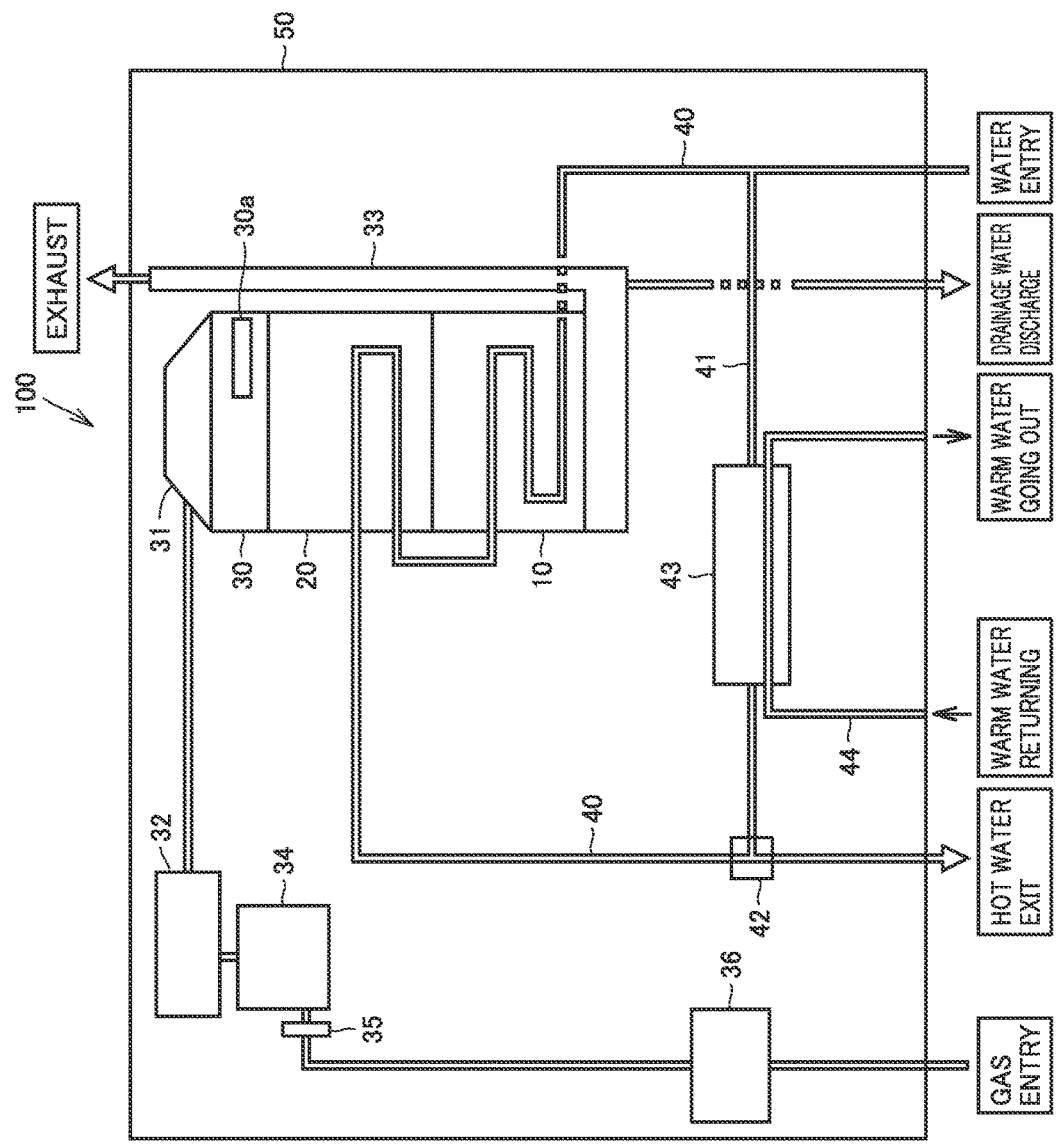
FIG. 1 is a diagram schematically showing a construction of a hot water apparatus in one embodiment of the present invention.
Figure 2:
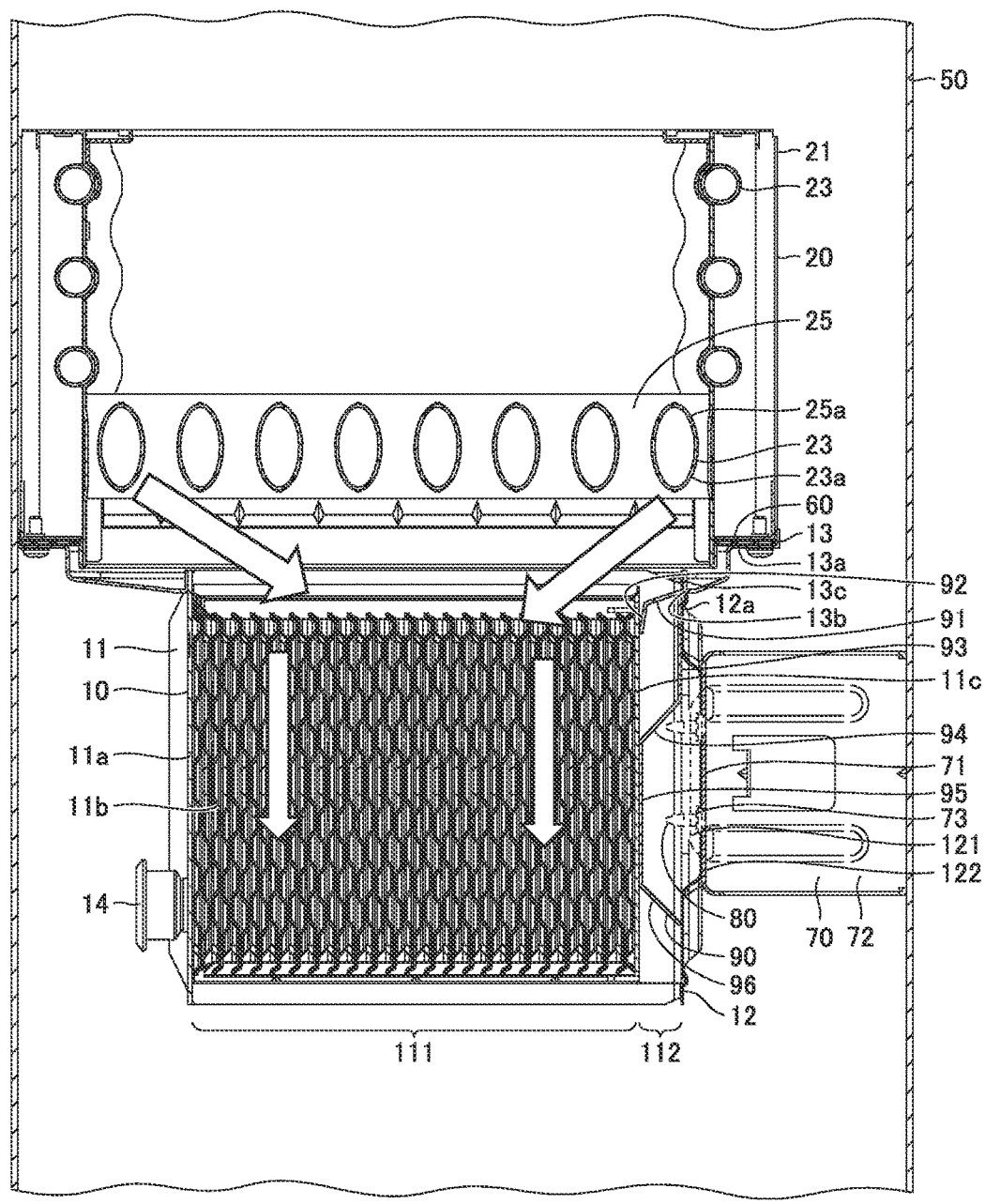
FIG. 2 is a cross-sectional view showing a flow of drainage water in a latent heat recovery heat exchanger in one embodiment of the present invention.

Referring to FIG. 1, a hot water apparatus 100 in the present embodiment mainly includes a latent heat recovery heat exchanger (secondary heat exchanger) 10, a sensible heat recovery heat exchanger (primary heat exchanger) 20, a combustion apparatus (burner) 30, a chamber 31, a fan assembly 32, a duct 33, a venturi 34, an orifice 35, a gas valve 36, a pipe 40, a bypass pipe 41, a three-way valve 42, a liquid to liquid heat exchanger 43, a hydronic pipe 44, and a housing 50. Referring to FIG. 2, hot water apparatus 100 includes a sealing member 60, a fixing member 70, an attachment member 80, and a straightening vane 90. All of components except for housing 50 among the components above are accommodated in housing 50.

As shown in FIG. 1, fan assembly 32 is configured to send a mixture gas of a fuel gas and air taken in from the outside of housing 50 to combustion apparatus 30. Fan assembly 32 includes a fan case, an impeller arranged in the fan case, and a drive source (such as a motor) for rotating the impeller.

The fuel gas flows to venturi 34 through gas valve 36 and orifice 35. Gas valve 36 is configured to control a flow rate of the fuel gas. Air taken in from the outside of housing 50 flows to venturi 34.

The fuel gas and air are mixed in venturi 34. Venturi 34 is configured to increase a flow velocity of the mixture gas by reducing the flow of the mixture gas of the fuel gas and air. The mixture gas which has passed through venturi 34 is sent by fan assembly 32 to combustion apparatus 30 through chamber 31.

Combustion apparatus (burner) 30 is configured to generate a heating gas (combustion gas). Combustion apparatus 30 is configured to supply the combustion gas to sensible heat recovery heat exchanger 20 and latent heat recovery heat exchanger 10. Combustion apparatus 30 is an inverse combustion type apparatus which supplies a combustion gas downward. The mixture gas issued from combustion apparatus 30 is ignited by an igniter 30a and becomes the combustion gas.

The combustion gas sequentially passes through sensible heat recovery heat exchanger 20 and latent heat recovery heat exchanger 10. Thereafter, the combustion gas is discharged to the outside of housing 50 through duct 33. Therefore, the combustion gas flows downward from above through the inside of sensible heat recovery heat exchanger 20 and latent heat recovery heat exchanger 10, changes its direction in duct 33, and flows upward from below.

Each of sensible heat recovery heat exchanger 20 and latent heat recovery heat exchanger 10 is configured to exchange heat with the combustion gas supplied by combustion apparatus 30. Sensible heat recovery heat exchanger 20 is attached under combustion apparatus 30 and latent heat recovery heat exchanger 10 is attached under sensible heat recovery heat exchanger 20.

Sensible heat recovery heat exchanger 20 is a heat exchanger for recovering sensible heat of the combustion gas. Sensible heat recovery heat exchanger 20 recovers sensible heat of the heating gas (combustion gas) generated by combustion apparatus 30. Latent heat recovery heat exchanger 10 is a heat exchanger for recovering latent heat of the combustion gas. Latent heat recovery heat exchanger 10 recovers latent heat of the heating gas (combustion gas).

Water vapor of the combustion gas is condensed in latent heat recovery heat exchanger 10 and condensed water (drainage water) is produced. Drainage water is drained to the outside of housing 50 through a part of duct 33.

When a temperature of incoming water and/or hot water is low or when an amount of heating by combustion apparatus 30 is small, drainage water is produced also in sensible heat recovery heat exchanger 20. Drainage water is drained to the outside of housing 50 through a part of duct 33 via latent heat recovery heat exchanger 10.

Sensible heat recovery heat exchanger 20 and latent heat recovery heat exchanger 10 are connected to each other through pipe 40. A part of pipe 40 on a water entry side relative to latent heat recovery heat exchanger 10 and a part of pipe 40 on a hot water exit side relative to sensible heat recovery heat exchanger 20 are bypassed by bypass pipe 41.

The part of pipe 40 on the hot water exit side relative to sensible heat recovery heat exchanger 20 and bypass pipe 41 are connected to each other by three-way valve 42. Three-way valve 42 is constructed to be able to switch between a flow path from sensible heat recovery heat exchanger 20 to a hot water outlet of pipe 40 and a flow path from sensible heat recovery heat exchanger 20 to bypass pipe 41.

Liquid to liquid heat exchanger 43 is connected to bypass pipe 41. Hydronic pipe 44 connected to a hydronic terminal is inserted in liquid to liquid heat exchanger 43. Warm water warmed as a result of passage through sensible heat recovery heat exchanger 20 and latent heat recovery heat exchanger 10 flows in liquid to liquid heat exchanger 43. As warm water which flows in liquid to liquid heat exchanger 43 flows outside hydronic pipe 44, heat can be exchanged between warm water which flows in liquid to liquid heat exchanger 43 and warm water which flows in hydronic pipe 44.

Water supplied to hot water apparatus 100 becomes hot as a result of heat exchange with the combustion gas in sensible heat recovery heat exchanger 20 and latent heat recovery heat exchanger 10. Hot water can thus be supplied by hot water apparatus 100.

Warm water which returns from the hydronic terminal passes through hydronic pipe 44 to be warmed as a result of heat exchange with warm water warmed by sensible heat recovery heat exchanger 20 and latent heat recovery heat exchanger 10 in liquid to liquid heat exchanger 43 and thereafter it is supplied again to the hydronic terminal. Warm water can thus be supplied to the hydronic terminal by hot water apparatus 100.

The heat exchanger in the present embodiment is applied to latent heat recovery heat exchanger 10 of hot water apparatus 100.

Figure 3:
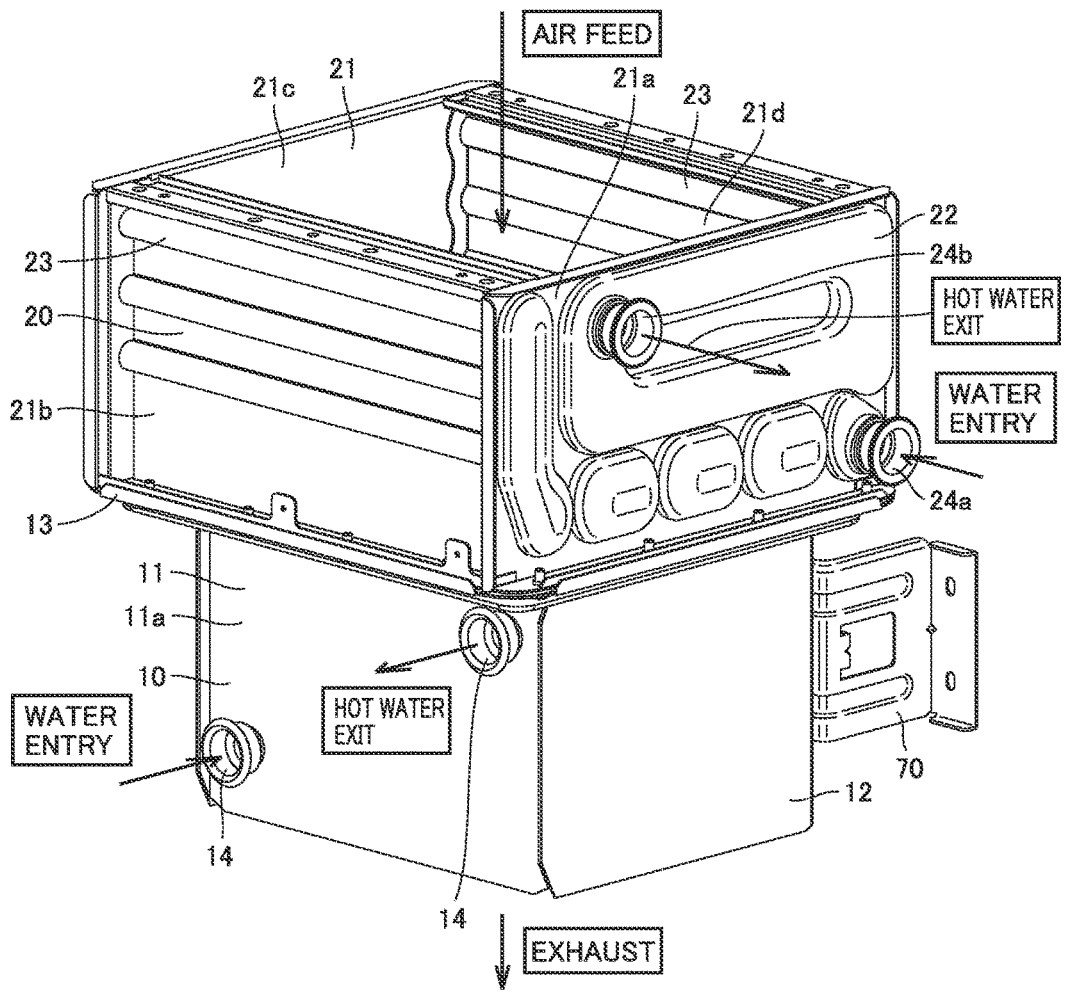
FIG. 3 is a perspective view schematically showing a construction of a sensible heat recovery heat exchanger and a latent heat recovery heat exchanger in one embodiment of the present invention.

A construction of a heat exchanger set in the present embodiment will now be described with reference to FIGS. 2 to 4. The heat exchanger set includes latent heat recovery heat exchanger 10, sensible heat recovery heat exchanger 20, and sealing member 60. Sensible heat recovery heat exchanger 20 is arranged on latent heat recovery heat exchanger 10 with sealing member 60 being interposed. Sealing member 60 lies between latent heat recovery heat exchanger 10 and sensible heat recovery heat exchanger 20. Sealing member 60 is in a surrounding shape. Sealing member 60 is in a form of a flat plate.

The heat exchanger set is fixed to housing 50 by fixing latent heat recovery heat exchanger 10 to housing 50 with fixing member 70 for fixing latent heat recovery heat exchanger 10 to housing 50. Fixing member 70 is fixed to latent heat recovery heat exchanger 10 with attachment member 80.

Figure 5:
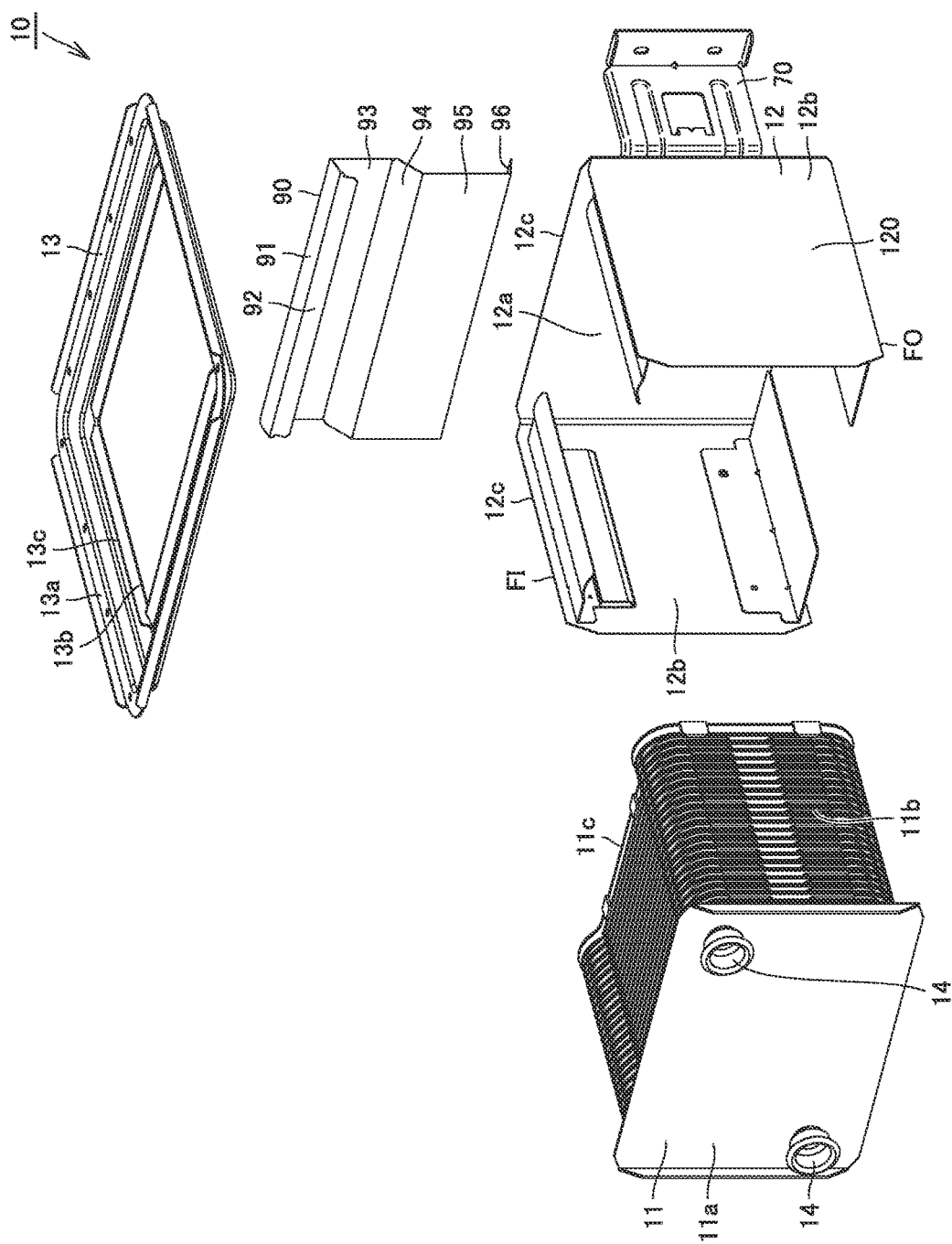
FIG. 5 is an exploded perspective view schematically showing the construction of the latent heat recovery heat exchanger in one embodiment of the present invention.

Referring to FIGS. 4 and 5, latent heat recovery heat exchanger 10 mainly includes a heat exchange unit 11, a case 12, a flange member 13, and a pipe joint portion 14.

Heat exchange unit 11 includes a front plate portion 11a, a heat exchange portion 11b, and a rear plate portion 11c. Heat exchange portion 11b is configured to exchange heat between a heating gas which flows outside and water and/or hot water which flows inside. Heat exchange portion 11b includes a plurality of heat transfer plates.

Front plate portion 11a and rear plate portion 11c are arranged to sandwich heat exchange portion 11b. Front plate portion 11a is brazed to a front surface of the heat transfer plate arranged in the forefront among the plurality of heat transfer plates of heat exchange portion 11b. Rear plate portion 11c is brazed to a rear surface of the heat transfer plate arranged rearmost among the plurality of heat transfer plates of heat exchange portion 11b.

The plurality of heat transfer plates are layered on one another. The plurality of heat transfer plates are arranged as being superimposed on one another in a direction in which front plate portion 11a and rear plate portion 11c are opposed to each other. Adjacent heat transfer plates of the plurality of heat transfer plates are brazed to each other. A gap between a pair of adjacent heat transfer plates of the plurality of heat transfer plates defines a flow path through which water and/or hot water passes.

A space between the pairs of adjacent heat transfer plates of the plurality of heat transfer plates defines a flow path through which a combustion gas flows. Each of a space between a pair of heat transfer plates and front plate portion 11a and a space between a pair of heat transfer plates and rear plate portion 11c also defines a flow path through which a combustion gas passes. Heat can thus be exchanged between water and/or hot water which passes through latent heat recovery heat exchanger 10 and a combustion gas.

The heat transfer plate has, for example, a substantially rectangular outer geometry in a plan view. The heat transfer plate is formed, for example, by pressing one flat plate. The heat transfer plate has flow path projections and recesses formed in pressing. The flow path projections and recesses of the heat transfer plate have a plurality of flow path projections and a plurality of flow path recesses. As the plurality of heat transfer plates are layered on one another, the plurality of flow path projections and the plurality of flow path recesses define flow paths for passage of water and/or hot water between a pair of heat transfer plates, and a space between the pair of heat transfer plates defines a flow path for passage of a combustion gas.

Case 12 accommodates heat exchange portion 11b. Front plate portion 11a of heat exchange unit 11 forms a part of case 12. Case 12 includes an inlet FI through which a heating gas flows in, an outlet FO through which a heating gas flows out, and a peripheral wall portion 120 connecting inlet FI and outlet FO to each other. Case 12 forms a frame which opens upward and downward. A heating gas flows into latent heat recovery heat exchanger 10 through inlet FI which is an upper opening and the heating gas flows out of latent heat recovery heat exchanger 10 through outlet FO which is a lower opening. Peripheral wall portion 120 of case 12 surrounds the plurality of heat transfer plates of heat exchange portion 11b.

Peripheral wall portion 120 of case 12 has front plate portion 11a, a rear wall portion 12a, and a pair of sidewall portions 12b. Rear wall portion 12a is arranged to sandwich a plurality of heat transfer plates between rear wall portion 12a and front plate portion 11a. Rear wall portion 12a is arranged opposite to front plate portion 11a with the plurality of heat transfer plates lying therebetween. The pair of sidewall portions 12b extends from opposing ends of rear wall portion 12a toward front plate portion 11a. The pair of sidewall portions 12b is joined to front plate portion 11a.

Figure 6:
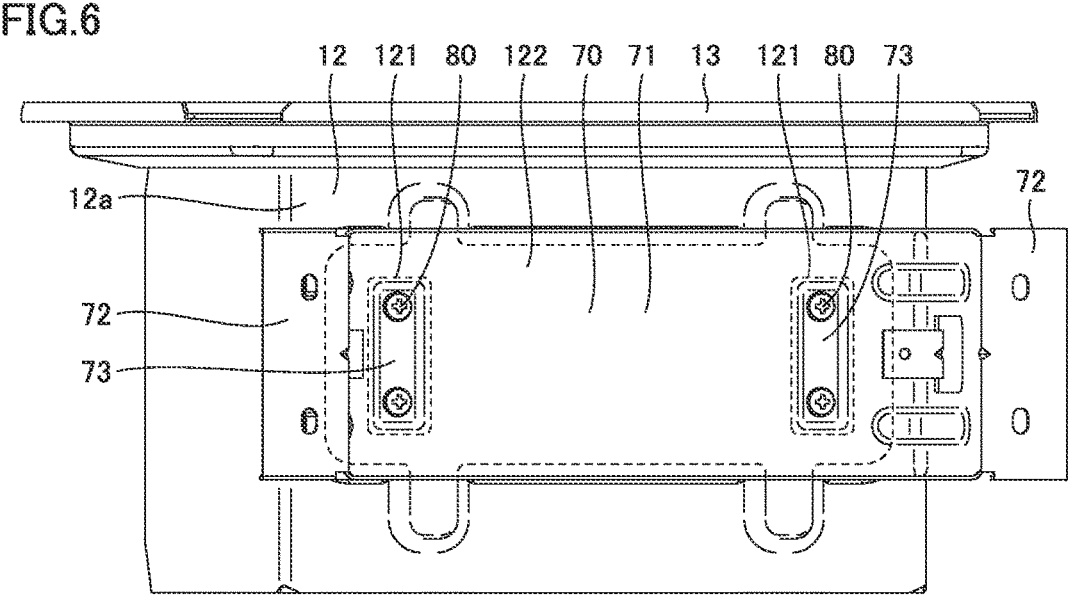
FIG. 6 is a perspective view schematically showing the construction of the latent heat recovery heat exchanger in one embodiment of the present invention.

Referring to FIGS. 2 and 6, attachment member 80 is configured to attach fixing member 70 to case 12. Attachment member 80 protrudes into case 12 while fixing member 70 is attached to an outer surface of rear wall portion 12a of case 12. For example, a screw or a pin is employed as attachment member 80, and the attachment member should only achieve strength of attachment higher than in attachment of fixing member 70 to case 12 with spot welding or an adhesive.

Case 12 includes an attachment portion 121 and a recess 122. Attachment portion 121 and recess 122 are provided in rear wall portion 12a of case 12. Two attachment portions 121 are provided. Two attachment portions 121 are arranged on respective sides of the pair of sidewall portions 12b relative to the center of rear wall portion 12a of case 12. Attachment member 80 is attached to attachment portion 121. Two attachment members 80 are attached to each of two attachment portions 121. Attachment portion 121 is substantially rectangular.

Recess 122 surrounds attachment portion 121. Recess 122 is recessed outward from the inside of case 12. Therefore, attachment portion 121 is recessed inward from the outside of case 12 as being opposite to recess 122.

Fixing member 70 includes a flat plate portion 71, an erected portion 72, and a projection portion 73. Flat plate portion 71 is arranged along rear wall portion 12a of case 12. Specifically, the flat plate portion is arranged along recess 122 in case 12. Two erected portions 72 are provided. Two erected portions 72 are erected from respective opposing ends of flat plate portion 71 toward a side opposite to case 12. Erected portion 72 extends toward housing 50 and is fixed to housing 50. Erected portion 72 is arranged on an outer side of each of the pair of sidewall portions 12b of case 12.

Projection portion 73 projects from flat plate portion 71 toward case 12 of latent heat recovery heat exchanger 10. Two projection portions 73 are provided. Two projection portions 73 are arranged on respective sides of the pair of sidewall portions 12b relative to the center of rear wall portion 12a of case 12. Two attachment members 80 are attached to each of two projection portions 73. Projection portion 73 is substantially rectangular. Projection portion 73 is fitted to attachment portion 121. Attachment member 80 is attached to projection portion 73 and attachment portion 121 while projection portion 73 is fitted to attachment portion 121. Specifically, while two projection portions 73 are fitted to two attachment portions 121, attachment member 80 is attached to pass through projection portion 73 and attachment portion 121 which are fitted to each other.

Figure 7:
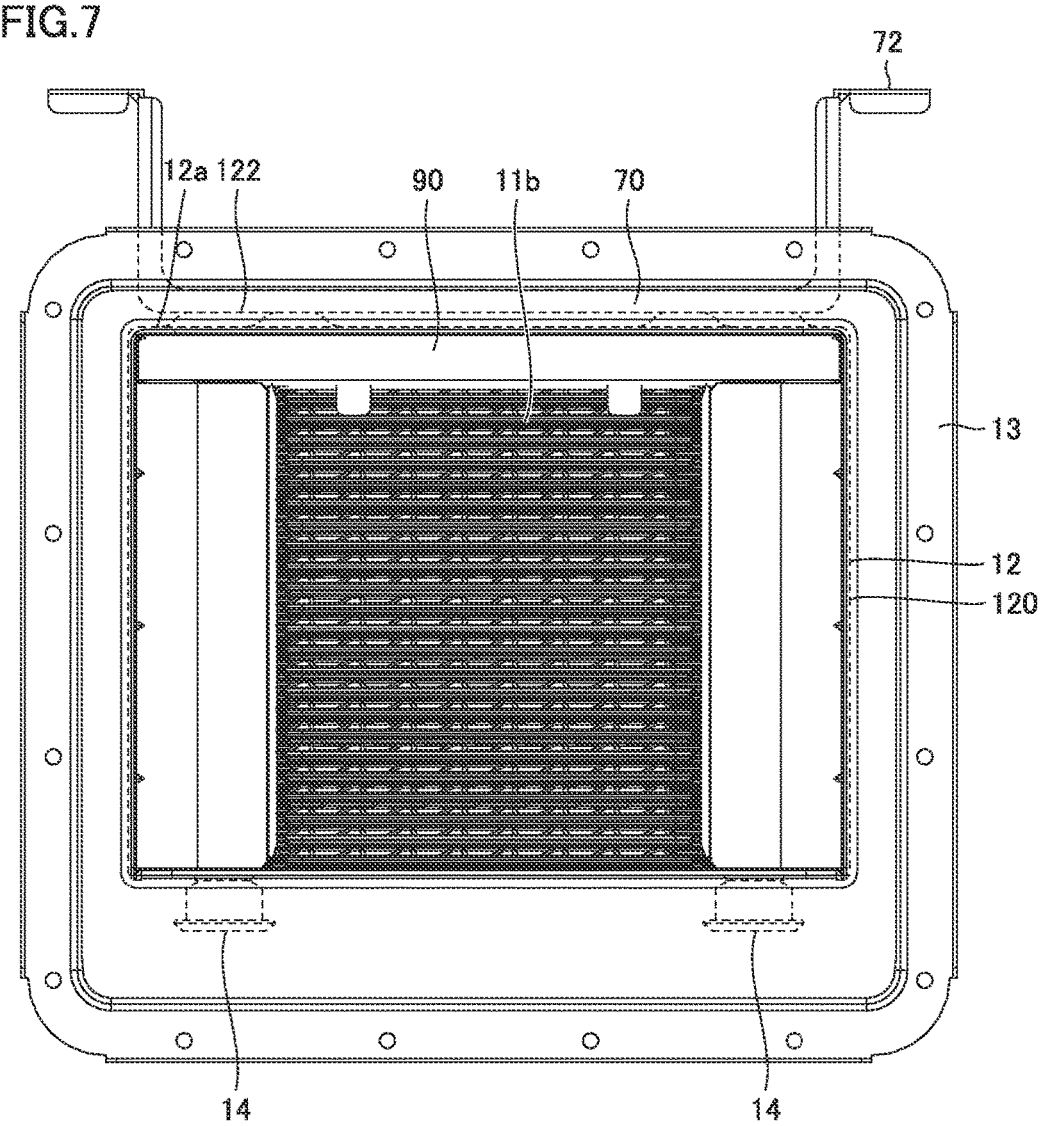
FIG. 7 is a plan view schematically showing the construction of the latent heat recovery heat exchanger in one embodiment of the present invention.

Referring to FIGS. 2, 5, and 7, straightening vane 90 is arranged in case 12. Specifically, straightening vane 90 is arranged between rear plate portion 11c of heat exchange unit 11 and rear wall portion 12a of case 12.

Straightening vane 90 includes a top plate portion 91, a biasing portion 92, a connection portion 93, a middle plate portion 94, a side plate portion 95, and a holding portion 96. Straightening vane 90 may be formed by bending one plate. Straightening vane 90 is arranged as being spaced apart from attachment member 80. Straightening vane 90 should have at least top plate portion 91.

Top plate portion 91 is arranged upstream from attachment member 80 in a direction of flow of the heating gas in case 12. In the present embodiment, top plate portion 91 is arranged directly above attachment member 80 in case 12. Therefore, top plate portion 91 is arranged to cover attachment member 80. Top plate portion 91 is inclined to have a down grade toward heat exchange portion 11b. The down grade is set, for example, preferably to at least three degrees and at most five degrees with respect to the horizontal.

When heat exchange portion 11b is viewed from inlet FI to outlet FO of case 12, peripheral wall portion 120 of case 12 has four sides. Inlet FI of case 12 is in a quadrangular shape when case 12 is viewed from above. Top plate portion 91 is arranged over the entire length of one side of the four sides of peripheral wall portion 120 of case 12. Top plate portion 91 extends along rear wall portion 12a.

Biasing portion 92 is connected to an end of top plate portion 91 on a side of front plate portion 11a. Biasing portion 92 is arranged between top plate portion 91 and heat exchange portion 11b. Top plate portion 91 abuts on case 12 while biasing portion 92 biases top plate portion 91 in a direction away from heat exchange portion 11b.

Biasing portion 92 abuts on rear plate portion 11c and top plate portion 91 abuts on an inner surface of rear wall portion 12a of case 12. Biasing portion 92 is inclined to have a down grade toward rear plate portion 11c while it does not abut on rear plate portion 11c. Biasing portion 92 deforms such that a down grade is at a steeper angle when it abuts on rear plate portion 11c than when it does not abut on the rear plate portion. Therefore, with resilience of biasing portion 92 to restore a state that it does not abut on rear plate portion 11c, biasing portion 92 can bias top plate portion 91 in a direction away from heat exchange portion 11b.

Connection portion 93 is connected to an end of top plate portion 91 on a side of rear wall portion 12a. Connection portion 93 extends downward along rear wall portion 12a. Middle plate portion 94 has an upper end connected to a lower end of connection portion 93. Middle plate portion 94 is arranged between attachment member 80 and top plate portion 91. Middle plate portion 94 is inclined to have a down grade toward heat exchange portion 11b. Middle plate portion 94 has a lower end arranged below attachment member 80.

Side plate portion 95 is connected to the lower end of middle plate portion 94. Side plate portion 95 extends downward along rear plate portion 11c. Side plate portion 95 is arranged between heat exchange portion 11b and attachment member 80. Holding portion 96 is connected to a lower end of side plate portion 95. Holding portion 96 is inclined to have a down grade toward rear wall portion 12a. Holding portion 96 has a lower end abutting on rear wall portion 12a. As a result of abutment of holding portion 96 on rear wall portion 12a, holding portion 96 can hold a position of straightening vane 90.

Case 12 includes a first region 111 where heat exchange portion 11b is arranged and a second region 112 where straightening vane 90 and attachment member 80 are arranged. Second region 112 is higher in air passage resistance against a flow of the heating gas than first region 111.

Figure 8:
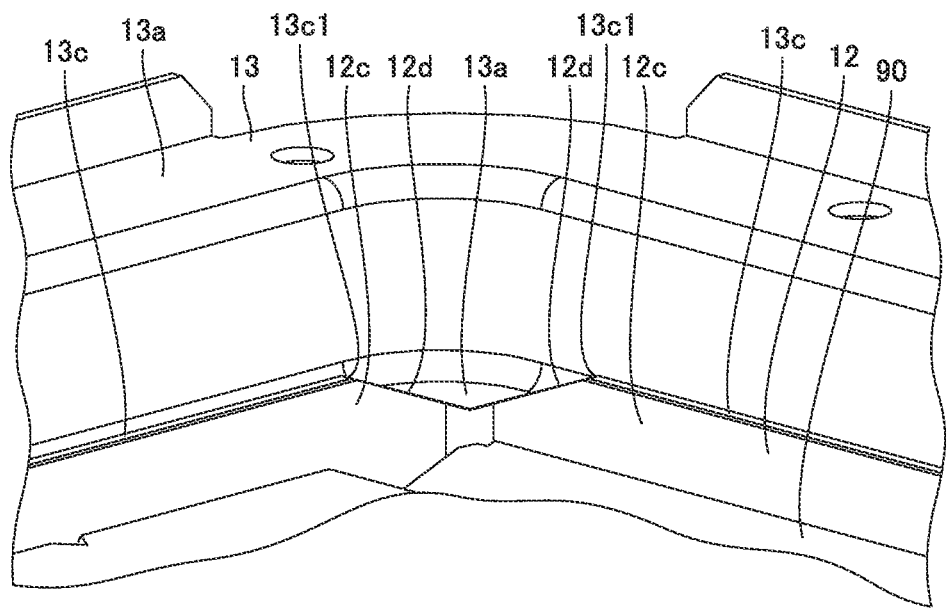
FIG. 8 is an enlarged view showing a VIII portion in FIG. 4.

Referring to FIGS. 4 and 8, flange member 13 is arranged in an upper end portion 12c of case 12. Flange member 13 is in a surrounding shape. Flange member 13 includes an extension portion 13a, an opening 13b, and a rising coupling portion 13c.

Extension portion 13a extends from upper end portion 12c of case 12 to the outside of case 12. Opening 13b is provided on an inner side of extension portion 13a. Opening 13b is surrounded by extension portion 13a. Extension portion 13a includes a first stepped portion and a second stepped portion arranged on an outer side of the first stepped portion. The first stepped portion is arranged on a side of opening 13b. The second stepped portion is arranged opposite to opening 13b with respect to the first stepped portion. The second stepped portion is arranged above the first stepped portion. Sealing member 60 is placed on the second stepped portion.

Rising coupling portion 13c rises upward from extension portion 13a as surrounding opening 13b. Upper end portion 12c of case 12 is inserted in opening 13b. Rising coupling portion 13c is joined from the outer side to upper end portion 12c of case 12 inserted in opening 13b.

A first cut portion 13c1 is provided in an upper edge of rising coupling portion 13c. Therefore, rising coupling portion 13c is low in height in first cut portion 13c1. A second cut portion 12d is provided in an upper edge of upper end portion 12c of case 12. Therefore, upper end portion 12c of case 12 is low in height in second cut portion 12d.

First cut portion 13c1 is arranged to be superimposed on second cut portion 12d while upper end portion 12c of case 12 is inserted in opening 13b. First cut portion 13c1 and second cut portion 12d are arranged to communicate with each other. Top plate portion 91 is arranged below first cut portion 13c1 and second cut portion 12d.

Opening 13b is quadrangular when flange member 13 is viewed from above. First cut portion 13c1 and second cut portion 12d are provided in each of four corners of opening 13b.

Referring again to FIGS. 2 to 4, a pair of pipe joint portions 14 is attached to front plate portion 11a. Pipe joint portion 14 is configured to allow water and/or hot water to flow in and out of the plurality of heat transfer plates. The uppermost heat transfer plate is connected to the pair of pipe joint portions 14 with front plate portion 11a being interposed. Each of the pair of pipe joint portions 14 is a pipe joint for connecting a pipe. A flow path in each of the pair of pipe joint portions 14 is connected to an internal flow path of each of the plurality of heat transfer plates.

A pipe connected to one of the pair of pipe joint portions 14 is a pipe for allowing water and/or hot water to flow into an internal flow path in each of a pair of heat transfer plates. A pipe connected to the other of the pair of pipe joint portions 14 is a pipe for allowing water and/or hot water to flow out of the internal flow path in each of the pair of heat transfer plates.

A through hole is provided in each of the plurality of heat transfer plates. Each through hole communicates with an internal flow path in the pair of heat transfer plates. The through hole is arranged directly under pipe joint portion 14. The through hole communicates with a flow path in pipe joint portion 14. Therefore, water and/or hot water introduced from pipe joint portion 14 on a water entry side flows through the internal flow path in each of the pair of heat transfer plates and thereafter exits from pipe joint portion 14 on the hot water exit side.

Sensible heat recovery heat exchanger (primary heat exchanger) 20 mainly includes a case 21, a header 22, and a heat transfer tube 23. Case 21 includes a first sidewall 21a to a fourth sidewall 21d. First sidewall 21a to fourth sidewall 21d are connected in the order of first sidewall 21a to fourth sidewall 21d. Case 21 forms a frame which opens upward and downward. A combustion gas is fed through the upper opening and the combustion gas is exhausted through the lower opening. First sidewall 21a and third sidewall 21c face each other and second sidewall 21b and fourth sidewall 21d face each other. Case 21 of sensible heat recovery heat exchanger 20 is greater in width dimension than case 12 of latent heat recovery heat exchanger 10.

Header 22 is provided on an outer surface of first sidewall 21a. A pipe joint 24a on the water entry side and a pipe joint 24b on the hot water exit side are attached to header 22 provided on the outer surface of first sidewall 21a. Not-shown header 22 is provided also on an outer surface of third sidewall 21c.

Header 22 provided on the outer surface of first sidewall 21a and header 22 provided on the outer surface of third sidewall 21c are connected to each other through a plurality of heat transfer tubes 23. The plurality of heat transfer tubes 23 are provided in a region surrounded by first sidewall 21a to fourth sidewall 21d as well as in second sidewall 21b and fourth sidewall 21d. Heat transfer tube 23 has a water entry portion for entry of water and/or hot water in heat transfer tube 23. The water entry portion is a portion where water and/or hot water enters heat transfer tube 23 first.

Water and/or hot water introduced from pipe joint 24a on the water entry side reaches header 22 provided on the outer surface of third sidewall 21c through not-shown heat transfer tube 23 from header 22 provided on the outer surface of first sidewall 21a. Water and/or hot water which has reached header 22 provided on the outer surface of third sidewall 21c reaches header 22 provided on the outer surface of first sidewall 21a through an adjacent heat transfer tube 23 connected to header 22. Water and/or hot water which has reached header 22 provided on the outer surface of first sidewall 21 reaches header 22 provided on the outer surface of third sidewall 21c through an adjacent heat transfer tube 23 connected to the header.

Water and/or hot water further goes back and forth between header 22 provided on the outer surface of first sidewall 21a and header 22 provided on the outer surface of third sidewall 21c through heat transfer tube 23. Finally, water and/or hot water exits from pipe joint 24b on the hot water exit side. Thus, water and/or hot water which flows in from pipe joint 24a on the water entry side flows out of pipe joint 24b on the hot water exit side through header 22 provided on the outer surface of first sidewall 21a, heat transfer tube 23, and header 22 provided on the outer surface of third sidewall 21c.

A plurality of fins 25 are accommodated in case 21 of sensible heat recovery heat exchanger 20. The plurality of fins 25 are arranged as being layered on and spaced apart from one another. A through hole 25a is provided in each of the plurality of fins 25. Through holes 25a are arranged as being superimposed on one another in a direction of layering of the plurality of fins 25. Heat transfer tube 23 is inserted in through holes 25a in the plurality of fins 25. A water entry portion 23a of heat transfer tube 23 is arranged in a lower right portion of case 21 in FIG. 2.

Any one of first cut portion 13c1 and second cut portion 12d provided in each of four corners of opening 13b of flange member 13 shown in FIG. 8 is arranged directly under water entry portion 23a of heat transfer tube 23 shown in FIG. 2.

As shown in FIG. 2, in sensible heat recovery heat exchanger 20, when a temperature of water and/or hot water which enters heat transfer tube 23 is low or when an amount of heating by combustion apparatus 30 is small, drainage water is produced. Drainage water flows into latent heat recovery heat exchanger 10.

Figure 9:
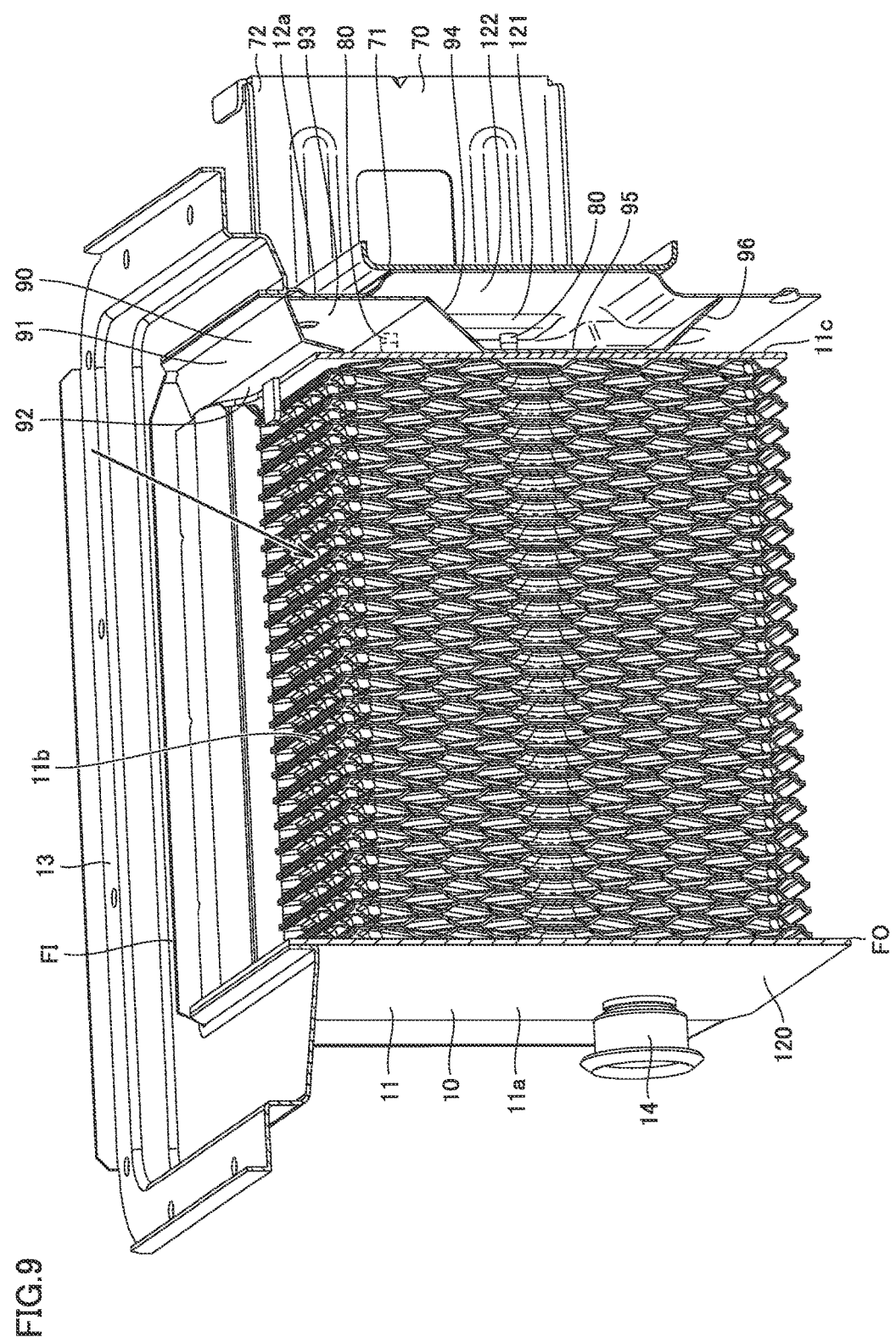
FIG. 9 is a cross-sectional perspective view schematically showing the construction of the latent heat recovery heat exchanger in one embodiment of the present invention.

Referring to FIGS. 2 and 9, drainage water which flows into latent heat recovery heat exchanger 10 from sensible heat recovery heat exchanger 20 flows over an upper surface of top plate portion 91 of straightening vane 90 and flows to heat exchange portion 11b. Specifically, drainage water which flows into latent heat recovery heat exchanger 10 from sensible heat recovery heat exchanger 20 stays on an upper surface of flange member 13. Since first cut portion 13c1 and second cut portion 12d are provided, drainage water flows through first cut portion 13c1 and second cut portion 12d to heat exchange portion 11b. Drainage water which flows into heat exchange portion 11b passes through heat exchange portion 11b and flows out of outlet FO.

Functions and effects of the present embodiment will now be described in comparison with a comparative example.

Figure 10:
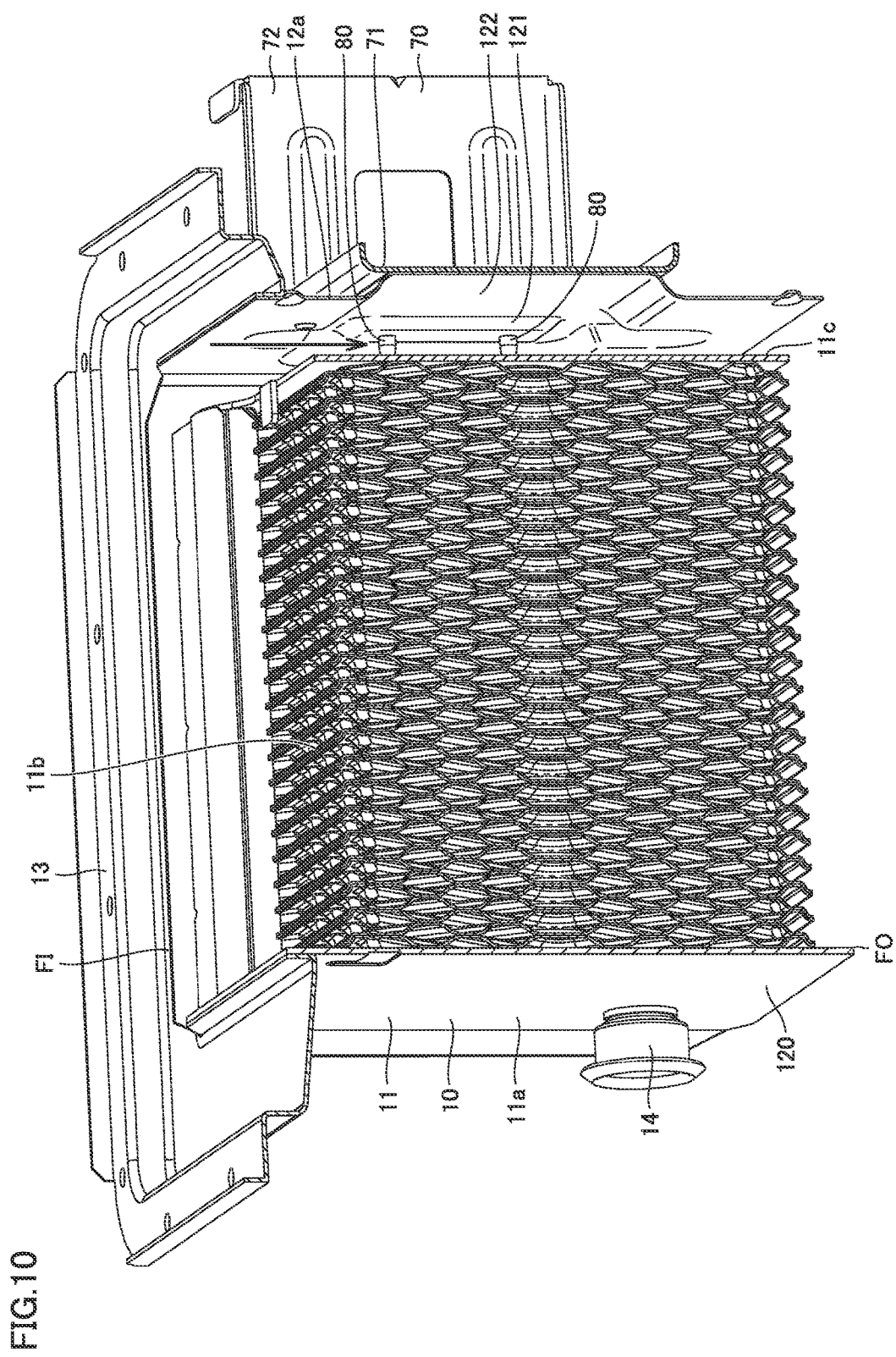
FIG. 10 is a cross-sectional perspective view schematically showing a construction of a latent heat recovery heat exchanger in a comparative example of one embodiment of the present invention.

Latent heat recovery heat exchanger 10 in a comparative example will be described with reference to FIG. 10. Latent heat recovery heat exchanger 10 does not include straightening vane 90 in the present embodiment. Therefore, drainage water which flows into latent heat recovery heat exchanger 10 from sensible heat recovery heat exchanger 20 flows along an inner surface of rear wall portion 12a of case 12 and adheres to attachment member 80. Attachment member 80 may thus be corroded.

In contrast, according to latent heat recovery heat exchanger 10 in the present embodiment, as shown in FIGS. 2 and 9, straightening vane 90 includes top plate portion 91 arranged upstream from attachment member 80 in a direction of flow of the heating gas in case 12 and hence drainage water which moves toward attachment member 80 from above can be blocked by top plate portion 91. Adhesion of drainage water to attachment member 80 can thus be suppressed. Therefore, corrosion of attachment member 80 by adhesion of drainage water can be suppressed.

According to latent heat recovery heat exchanger 10 in the present embodiment, as shown in FIG. 2, second region 112 is higher in air passage resistance against a flow of the heating gas than first region 111. Therefore, drainage water can more likely to flow together with the heating gas to first region 111 than to second region 112. Flow of drainage water into second region 112 can thus be suppressed. Therefore, adhesion of drainage water to attachment member 80 arranged in second region 112 can effectively be suppressed.

According to latent heat recovery heat exchanger 10 in the present embodiment, as shown in FIGS. 5 and 7, when heat exchange portion 11b is viewed from inlet FI toward outlet FO of case 12, top plate portion 91 is arranged over the entire length of one side of four sides of peripheral wall portion 120 of case 12. Therefore, drainage water which moves toward attachment member 80 from above can be blocked by top plate portion 91 over the entire length of one side of the four sides of peripheral wall portion 120 of case 12. Adhesion of drainage water to attachment member 80 can thus effectively be suppressed.

According to latent heat recovery heat exchanger 10 in the present embodiment, as shown in FIGS. 2 and 9, top plate portion 91 is inclined to have a down grade toward heat exchange portion 11b so that drainage water which adheres to top plate portion 91 can flow toward heat exchange portion 11b. Therefore, flow of drainage water which adheres to top plate portion 91 toward rear wall portion 12a can be suppressed. Adhesion to attachment member 80 of drainage water which adheres to top plate portion 91 can thus effectively be suppressed.

According to latent heat recovery heat exchanger 10 in the present embodiment, as shown in FIGS. 2 and 9, middle plate portion 94 is inclined to have a down grade toward heat exchange portion 11b. Therefore, drainage water which adheres to middle plate portion 94 can flow toward heat exchange portion 11b. Adhesion to attachment member 80 of drainage water which adheres to middle plate portion 94 can thus be suppressed.

According to latent heat recovery heat exchanger 10 in the present embodiment, as shown in FIGS. 2 and 9, side plate portion 95 is arranged between heat exchange portion 11b and attachment member 80 and connected to the lower end of middle plate portion 94. Therefore, drainage water which adheres to middle plate portion 94 can flow along side plate portion 95. Adhesion to attachment member 80 of drainage water which adheres to middle plate portion 94 and side plate portion 95 can thus be suppressed.

According to latent heat recovery heat exchanger 10 in the present embodiment, as shown in FIGS. 2 and 6, recess 122 surrounds attachment portion 121 and recessed outward from the inside of case 12. Therefore, drainage water is stopped by recess 122 so that adhesion of drainage water to attachment member 80 can effectively be suppressed.

According to latent heat recovery heat exchanger 10 in the present embodiment, as shown in FIGS. 2 and 6, attachment member 80 is attached to projection portion 73 and attachment portion 121 while projection portion 73 of fixing member 70 is fitted to attachment portion 121 of case 12. Therefore, projection portion 73 is fitted to attachment portion 121 so that positioning of fixing member 70 in case 12 is facilitated.

According to latent heat recovery heat exchanger 10 in the present embodiment, as shown in FIGS. 2 and 5, while biasing portion 92 of straightening vane 90 biases top plate portion 91 in a direction away from heat exchange portion 11b, top plate portion 91 abuts on case 12. Therefore, a gap between top plate portion 91 and case 12 can be closed. Adhesion of drainage water to attachment member 80 through a gap between top plate portion 91 and case 12 can thus be suppressed.

In the hot water apparatus in the present embodiment, as shown in FIG. 8, top plate portion 91 is arranged below first cut portion 13c1 of flange member 13 and second cut portion 12d of case 12. Therefore, drainage water which flows through first cut portion 13c1 and second cut portion 12d can be blocked by top plate portion 91. Adhesion to attachment member 80 of drainage water which flows through first cut portion 13c1 and second cut portion 12d can thus be suppressed.

Though an embodiment of the present invention has been described, it should be understood that the embodiment disclosed herein is illustrative and non-restrictive in every respect. The scope of the present invention is defined by the terms of the claims and is intended to include any modifications within the scope and meaning equivalent to the terms of the claims.

What is claimed is:

1. A hot water apparatus comprising:
    a burner for generating a heating gas;
    a heat exchanger including a heat exchange portion for exchanging heat between the heating gas which flows outside and water and/or hot water which flows inside and a case which accommodates the heat exchange portion;
    a housing which accommodates the burner and the heat exchanger;
    a fixing member arranged in the housing for fixing the heat exchanger to the housing;
    an attachment member arranged in the housing for attaching the fixing member to the case; and
    a straightening vane arranged in the case,
    the attachment member protruding into the case, and
    the straightening vane including a top plate portion arranged upstream from the attachment member in a direction of flow of the heating gas in the case.

2. The hot water apparatus according to claim 1, wherein
the case includes a first region where the heat exchange portion is arranged and a second region where the straightening vane and the attachment member are arranged, and
the second region is higher in air passage resistance against the flow of the heating gas than the first region.

3. The hot water apparatus according to claim 1, wherein
the case includes an inlet where the heating gas flows in, an outlet where the heating gas flows out, and a peripheral wall portion which connects the inlet and the outlet to each other,
the peripheral wall portion has four sides when the heat exchange portion is viewed from the inlet toward the outlet, and
the top plate portion is arranged over an entire length of one side of the four sides.

4. The hot water apparatus according to claim 1, wherein
the top plate portion is inclined to have a down grade toward the heat exchange portion.

5. The hot water apparatus according to claim 1, wherein
the straightening vane includes a middle plate portion arranged between the attachment member and the top plate portion, and
the middle plate portion is inclined to have a down grade toward the heat exchange portion.

6. The hot water apparatus according to claim 5, wherein
the straightening vane includes a side plate portion arranged between the heat exchange portion and the attachment member, and
the side plate portion is connected to a lower end of the middle plate portion.

7. The hot water apparatus according to claim 1, wherein
the case includes an attachment portion to which the attachment member is attached and a recess which surrounds the attachment portion, and
the recess is recessed outward from inside of the case.

8. The hot water apparatus according to claim 1, wherein
the straightening vane includes a biasing portion arranged between the top plate portion and the heat exchange portion, and
the top plate portion abuts on the case while the biasing portion biases the top plate portion in a direction away from the heat exchange portion.

9. The hot water apparatus according to claim 1, wherein
the attachment member is a screw or a pin.

10. The hot water apparatus according to claim 1, wherein
the heat exchanger is a latent heat recovery heat exchanger, and
the hot water apparatus further comprises a sensible heat recovery heat exchanger disposed between the burner and the latent heat recovery heat exchanger.

11. A hot water apparatus comprising:
a burner for generating a heating gas;
a heat exchanger including a heat exchange portion for exchanging heat between the heating gas which flows outside and water and/or hot water which flows inside and a case which accommodates the heat exchange portion;
a housing which accommodates the burner and the heat exchanger;
a fixing member arranged in the housing for fixing the heat exchanger to the housing;
an attachment member arranged in the housing for attaching the fixing member to the case; and
a straightening vane arranged in the case, wherein
the attachment member protrudes into the case,
the straightening vane includes a top plate portion arranged upstream from the attachment member in a direction of flow of the heating gas in the case,
the fixing member includes a flat plate portion and a projection portion which projects from the flat plate portion toward the case of the heat exchanger, and
the attachment member is attached to the projection portion and an attachment portion of the case while the projection portion is fitted to the attachment portion.

12. A hot water apparatus comprising:
a burner for generating a heating gas;
a heat exchanger including a heat exchange portion for exchanging heat between the heating gas which flows outside and water and/or hot water which flows inside and a case which accommodates the heat exchange portion;
a housing which accommodates the burner and the heat exchanger;
a fixing member arranged in the housing for fixing the heat exchanger to the housing;
an attachment member arranged in the housing for attaching the fixing member to the case; and
a straightening vane arranged in the case, wherein
the attachment member protrudes into the case,
the straightening vane includes a top plate portion arranged upstream from the attachment member in a direction of flow of the heating gas in the case,
the heat exchanger includes a flange member arranged in an upper end portion of the case,
the flange member includes an extension portion which extends from the upper end portion of the case to outside of the case, an opening surrounded by the extension portion, and a rising coupling portion which rises upward from the extension portion so as to surround the opening,
a first cut portion provided in an upper edge of the rising coupling portion is arranged to be superimposed on a second cut portion provided in an upper edge of the upper end portion of the case while the upper end portion of the case is inserted in the opening, and
the top plate portion is arranged below the first cut portion and the second cut portion.

* * * * *